2 Sheets—Sheet 1.

A. J. MARTIN.
FEEDING MECHANISM FOR GRAIN DRILLS.

No. 169,561. Patented Nov. 2, 1875.

WITNESSES:
Will W. Dodge
Donn Twitchell

INVENTOR:
A. J. Martin
By his attys.
Dodge & Son.

A. J. MARTIN.
FEEDING MECHANISM FOR GRAIN DRILLS.
No. 169,561. Patented Nov. 2, 1875.
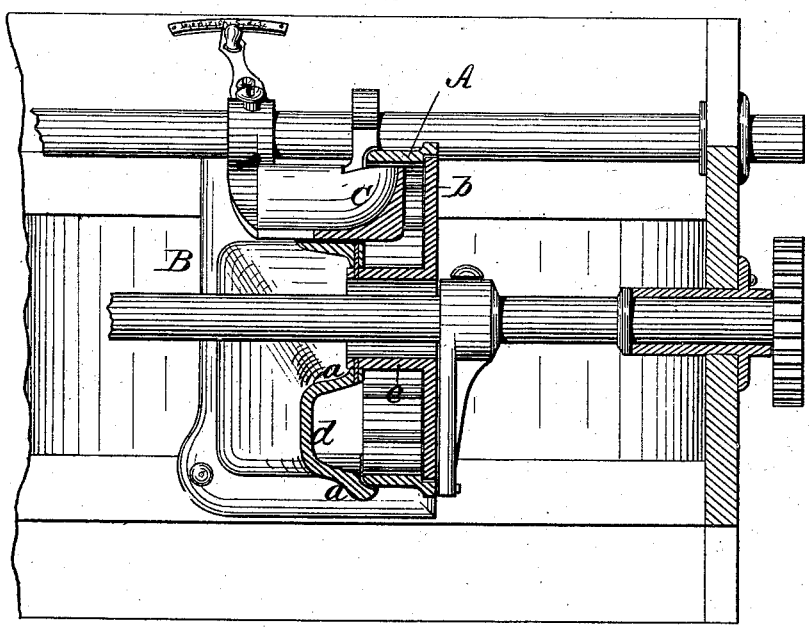
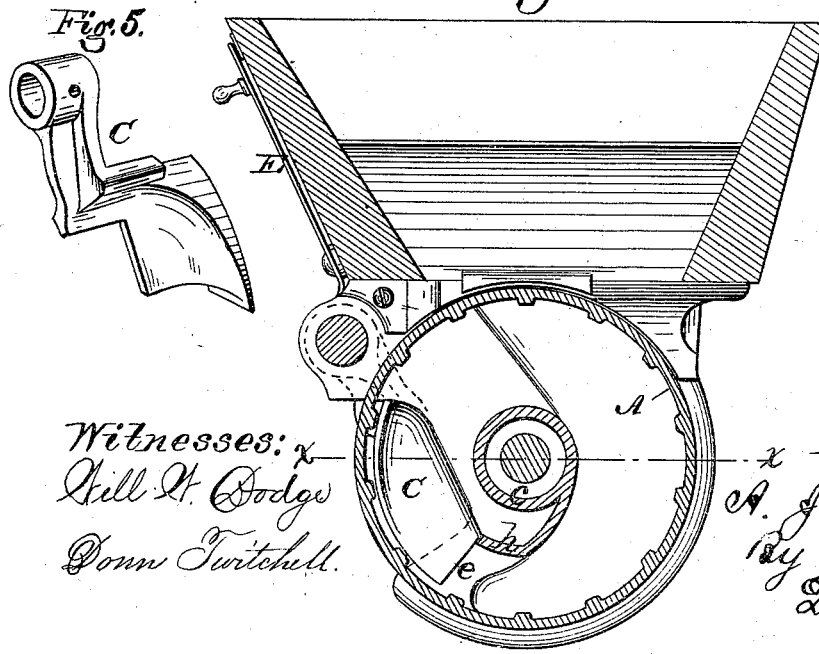
Witnesses:
Will H. Dodge
Donn Twitchell
Inventor:
A. J. Martin
By his attys
Dodge & Son

UNITED STATES PATENT OFFICE

ANDREW J. MARTIN, OF SPRINGFIELD, OHIO, ASSIGNOR TO P. P. MAST & CO., OF SAME PLACE.

IMPROVEMENT IN FEEDING MECHANISMS FOR GRAIN-DRILLS.

Specification forming part of Letters Patent No. 169,561, dated November 2, 1875; application filed August 19, 1875.

*To all whom it may concern:*

Be it known that I, ANDREW J. MARTIN, of Springfield, in the county of Clarke and State of Ohio, have invented certain Improvements in Feeding Mechanism for Grain-Drills and Seeders, of which the following is a specification:

My invention consists in the combination of a feed cup or case having a side delivery, a vertical feed ring or wheel mounted in said cup, and a laterally-moving gate entering through the side of the cup into the ring or wheel, for the purpose of controlling and varying the rate of discharge, the arrangement being such that the moving stream of grain is divided in the cup, and one portion directed outward through the discharge-opening, while the remaining portion is permitted to pass freely by the gate and around within the cup, so that there is no danger of its being crushed or caused to clog the moving parts.

Figure 1:
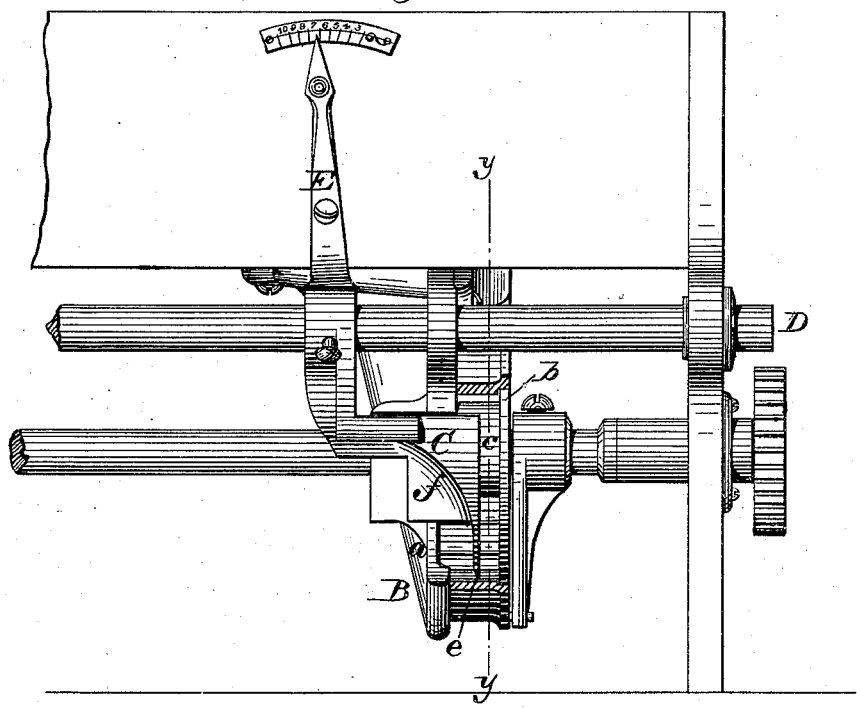
Figure 2:
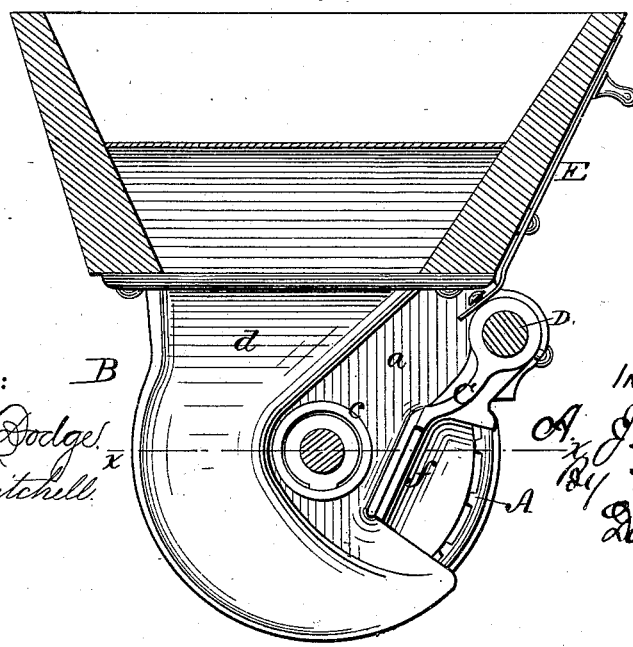

Figure 1 represents a rear elevation of my device with a portion of the carrying-ring broken away in order to expose the gate; Fig. 2, a side view of the device; Fig. 3, a horizontal cross-section of the same on the line $x\,x$; Fig. 4, a vertical cross-section of the same on the line $y\,y$; Fig. 5, a perspective view of the gate or cut-off.

My improvement is intended for use generally in those force-feeding devices which consist of a vertical ring, wheel, or disk, arranged to deliver the grain in a continuous stream from the side of a cup or case, the precise construction of these parts being immaterial.

The feeder consists, in the present instance, simply of an annular rim, ring, or band, A, mounted so as to rotate freely between the two vertical walls of a feed cup or case, B, the latter consisting of the two wall-plates $a$ and $b$, united by a central tubular hub extending through the ring, as clearly shown in Fig. 3. The plate $a$ is provided at its upper edge with flanges, by which to secure it in place, and with a hopper or pocket, $d$, to direct the grain inward into the ring, and also at its rear edge with an opening to permit the escape of the grain at the side. Through the discharge-opening into the ring there is inserted a horizontally-sliding gate, C, of the form shown in Fig. 5, and of a size sufficient to close the space between the ring and the central hub. The gate has, it will be seen, a flat vertical inner end, a sharp edge, $e$, at the lower side of said end, and a curved side face, $f$, inclining upward and outward from the edge $e$ through the discharge-opening, as clearly represented in Fig. 1. At its outer end the gate has a rigid arm, which is secured upon a longitudinally-moving shaft, D, as shown in all the figures. On the rear side of the hopper, to which the feed-cup is attached, there is pivoted a lever, E, the lower end of which is forked, and arranged to engage upon a stud on the gate for the purpose of moving the same, a scale being secured under the upper end of the lever, for the purpose of guiding the operator and enabling him to instantly set the machine to feed any given quantity per acre.

In order to secure a more perfect action of the parts the central hub $c$ is made with an eccentric enlargement, $h$, on the under side, in advance of the discharge-opening, as shown in Fig. 4, for the purpose of decreasing the vertical width of the seed throat or passage toward the outlet. As shown in Fig. 4, the part $h$ terminates at the rear end in a square shoulder, forming a guide and support, on which the lower side of the gate slides. The grain, entering through the hopper $d$ into the ring, is carried backward until it meets the edge $e$, by which it is divided, and one portion directed outward through the discharge-opening by the inclined face $f$, while the remaining portion is permitted to pass by the inner end of the arm between it and the plate $b$, and to continue its motion round and round in the cup indefinitely. Thus it will be seen that while the gate divides the moving stream of grain, and controls positively and accurately the amount of discharge, there is no possibility of the grain clogging or being cracked. By moving the gate it may be caused to divide the stream of grain at any point between the two side walls, or to direct the entire body passing down within the ring out through the side. As the gate is pushed inward the discharge is increased and the amount passing the end of the gate correspondingly decreased, until finally, when the feeder reaches its full capacity, the entire moving stream is discharged.

While I have shown the form of device which I prefer to use, it is obvious that the form and arrangement of the parts may be varied, the essential feature of the invention being the employment of a laterally-moving device, which will divide the moving stream of grain in the cup, and while directing one portion outward through the side permit the remainder to pass forward in the cup. It is obvious that the tongue may be arranged to swing instead of slide laterally, a long arm being used in such case, so that the gate will move in a practically straight line. It is also obvious that the gate may be used not only with the carrying-ring, as shown, but also with a feed-wheel having a groove or channel in its side, with a wheel having simply a peripheral carrying-flange, or with a wheel or disk having neither flange nor teeth.

Having described my invention, what I claim is—

1. In combination with a feed cup or case and a vertical feed wheel or ring, a gate movable laterally in a plane parallel with the axis of the wheel, substantially as shown and described, for the purpose of regulating the rate of feed.

2. In combination with the cup A and the ring B, or its equivalent, the horizontally-sliding gate having the sharp edge and the inclined outer face, substantially as shown and described.

3. In a feeding device for grain-drills, consisting of a cup or case and a vertical wheel or ring, a laterally-moving gate, substantially as shown and described, adapted to direct one portion of the grain out through the side of the cup, while the other portion is permitted to continue its course around within the same.

ANDREW J. MARTIN.

Witnesses:
A. P. LINN COCHRAN,
J. C. WATTERS.